United States Patent [19]

Medvecky

[11] 4,213,135
[45] Jul. 15, 1980

[54] STRIP CHART RECORDER

[75] Inventor: Eugene Medvecky, Bridgeport, Conn.

[73] Assignee: American Home Products Corporation, New York, N.Y.

[21] Appl. No.: 921,511

[22] Filed: Jul. 3, 1978

[51] Int. Cl.² .................... G01D 15/10; G01D 15/24; G01D 15/00
[52] U.S. Cl. ................... 346/76 PH; 346/136; 346/145; 400/120
[58] Field of Search .................. 346/76 PH, 136, 145; 400/120

[56] References Cited

U.S. PATENT DOCUMENTS

| | | | |
|---|---|---|---|
| 2,718,450 | 9/1955 | Leonard et al. | 346/145 UX |
| 3,066,299 | 11/1962 | Kampf | 346/145 UX |
| 3,154,368 | 10/1964 | Daigler et al. | 346/145 X |
| 3,370,300 | 2/1968 | Gilovich et al. | 346/136 X |
| 3,731,318 | 5/1973 | Dickey | 346/145 |
| 4,039,065 | 8/1977 | Seki et al. | 346/76 PH X |
| 4,130,752 | 12/1978 | Conta et al. | 346/76 PH X |
| 4,141,019 | 2/1979 | Johnson | 346/136 |

*Primary Examiner*—George H. Miller, Jr.
*Attorney, Agent, or Firm*—Darby & Darby

[57] ABSTRACT

A thermal strip chart recorder is provided in which the strip chart is transported at a precise predetermined speed with consistent print darkness. A thermal printing assembly compresses the chart against a cushioned roller with sufficient force to provide dark printing. The printing assembly includes a plurality of printing heads mounted for independent movement in a side-by-side relationship. The roller includes circumferentially spaced sprockets near either end and a central, coaxial, cushioned sleeve which rotates freely with respect to the sprockets. In operation, the roller is driven at a precise rotational speed and moves the strip chart at a precise linear speed by means of the sprockets, which engage sprocket holes in the strip chart. In operation, the strip chart is moved at a precise speed regardless of the printing head pressure, because the freely rotatable sleeve exerts no drag on the strip chart regardless of how much the sleeve is compressed. The recorder also includes a display face plate for printed strip chart which may be released to pivot outward and downward to permit access to the interior of the recorder for replenishing the strip chart material. The display face is also adjustable to tilt backward for more convenient viewing of a printed strip chart.

38 Claims, 14 Drawing Figures

STRIP CHART RECORDER

This invention relates generally to a transporting and printing device for strip chart material and, more particularly, concerns such an apparatus for use in applictions requiring the strip chart to be transported at a precise speed.

Graphic recorders for strip charts have found broad application in many fields. For example, such recorders have been used in lie detectors and in the medical field to record the time variation of the human heartbeat and other physical parameters. In such applications, it is the common practice to transport the strip chart at a precise, predetermined rate, so that the length of the printed chart can be related accurately to the passage of time. It is typical, in such applications, to make the recording with an ink-fed pen which is driven by a galvanometer movement, or the like. Unfortunately, such movements, like all delicate moving parts, are prone to go out of adjustment or to be damaged during normal handling, which can sometimes be rough. Also, galvanometer movements are sensitive to environmental conditions and relatively small variations in the electronics which drive them, so that frequent calibration and/or adjustment is necessary. It has also been found inconvenient to use ink-fed pens because of the need to provide a continuous supply of ink and the loss of information occasioned by leakage or malfunctioning of the ink feed mechanism.

Some of the shortcomings of graphic recorders using ink-fed pens have been overcome with electronic scanning techniques. For example, it has been suggested that heat-sensitive strip chart material be used and that the printing component or head be an array of selectively actuable heating elements aligned normally to the direction of transport of the strip chart. Using the digital techniques, as taught for example in U.S. Pat. No. 3,394,383 of July 23, 1968, selected heating elements could then be actuated to produce a waveform, comprising a series of closely spaced dots, which is similar to that of an ink-fed pen. The major shortcoming of such recording devices is that it is difficult to obtain uniform darkness of the various dots. This results from the difficulty of providing equal pressure between the strip chart and each heating element on the printing head, which head can include an array of 100 or 200 elements.

To alleviate this problem, it has been suggested that the strip chart be compressed between the printing head a pressure member with a cushioned face. However, such an arrangement has an unpredictable effect on the transport speed of the strip chart and would be unacceptable in a device requiring an accurate transport speed. For example, in U.S. Pat. No. 3,848,720 of Nov. 19, 1974, a pressure spring with a cushioned face was utilized to compress a heat-sensitive strip chart against a thermal printing head. This arrangement required that the pressure spring be released periodically in order to permit transport of the strip chart. This resulted in a relatively choppy, uneven transport of the strip chart, so that its transport speed could not be controlled readily.

It has also been suggested that more uniform printing could be attained by compressing the strip chart between the printer head and a cushioned roller and that the roller itself transport the strip chart, for example, by means of sprockets provided at either end of the roller. Such an arrangement proves unsatisfactory because, although the roller could be rotated at an accurate speed, the cushioned part of the roller, being compressed by the print head, has a slower linear speed than the sprockets on the roller and exerts a drag on the strip chart. Moreover, the linear speed of the compressed part of the roller depends, among other factors, on the pressure applied by the print head and is, therefore, unpredictable. It has been found that the pressure sufficient to assure uniform darkness of print could provide a sufficient difference between the linear speed of the sprockets and the compressed portion of the roller to result in tearing of the sprocket holes in the strip chart.

In accordance with an illustrative embodiment demonstrating objects and features of the invention, a thermal strip chart recoreder is provided in which a thermal printing assembly compresses the chart against a cushioned roller with sufficient force to provide dark printing. The printing assembly includes a plurality of printing heads mounted for independent movement in a side-by-side relationship. The roller includes circumferentially spaced sprockets near either end and a central, coaxial, cushioned sleeve which rotates freely with respect to the sprockets. In operation, the roller is driven at a precise rotational speed and moves the strip chart at a precise linear speed by means of the sprockets, which engage sprocket holes in the strip chart. In operation, the strip chart is moved at the precise speed regardless of the printing head pressure, because the freely rotatable sleeve exerts no drag on the strip chart regardless of how much the sleeve is compressed. The recorder also includes a display face plate for printed strip chart which may be released to pivot outward and downward to permit access to the interior of the recorder for replenishing the strip chart material. The display face is also adjustable to tilt backward for more convenient viewing of a printed strip chart.

The foregoing brief description, as well as further objects, features and advantages of the present invention, will be more completely understood from the following detailed description of presently preferred, but nonetheless illustrative, embodiments in accordance with the present invention, with reference being had to the accompanying drawing, in which.

Figures 1, 2:
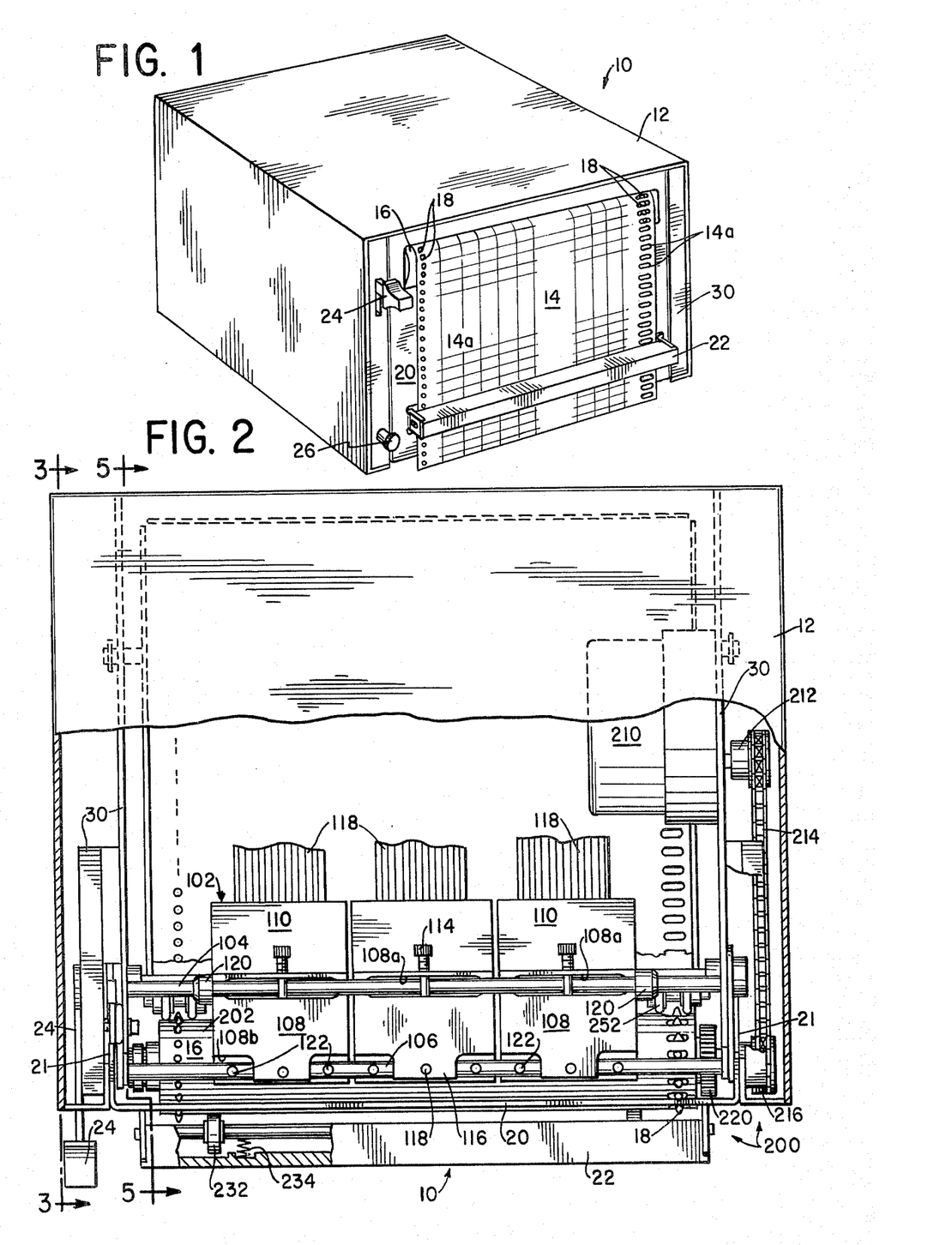
FIG. 1 is a perspective view of a strip chart recorder in accordance with the present invention.
FIG. 2 is a top plan view, on an enlarged scale, showing the strip chart recorder of FIG. 1, with portions cut away to illustrate internal constructional details.

Referring now to the details of the drawing, FIG. 1 illustrates a preferred form of a strip chart recorder 10 in accordance with the present invention. The recorder 10 is shown enclosed in a housing or cabinet 12, but it will be appreciated that, in some applications, it may be preferred to mount the recorder directly in a chassis including other equipment, which will provide the electrical signals for producing the waveform of the strip chart recorder. The strip chart material 14 is stored inside the recorder 10, as will be explained in more detail below, and is of a conventional variety which includes equally spaced sprocket holes 14a along each edge. The motive force for transporting the strip chart 14 is provided via a drive roll assembly 16 having sprockets 18 positioned to mesh with sprocket holes 14a. From drive roller assembly 16 the strip chart material is transported over a display face assembly 20 by means of takeup rollers (not shown), behind the bar 22, which are driven from drive roller assembly 16. This arrangement provides sufficient tension on the strip chart 14 to transport it smoothly while keeping it substantially flat against the display face 20.

Display face assembly 20 includes flange portions 21 which, by mechanisms to be described, permitted it to be mounted on the recorder for various independent movement of display face assembly 20. A lever 24 is provided which, when depressed, releases the upper portion of the display face 20 and permits it to pivot outward and downward (compare FIGS. 3 and 9), thereby permitting access to the interior of recorder 10 for making adjustments and repairs or for replenishing the supply of strip chart material. In addition, the recorder 10 includes a plunger 26 which, when pulled outwardly, releases the lower end of display face 20 so that it may be drawn outward (compare FIGS. 4 and 3) to its tilted position. Upon release of plunger 26, it is returned to its normal position and display face 20 is locked in its tilted position.

Inside the cabinet 12, recorder 10 includes: a chassis or frame 30 on which all components of the recorder are mounted; a print head assembly 100, which includes selectively actuable heat-producing elements to mark the heat-sensitive strip chart 14; a transport assembly 200, including drive roller assembly 16, which transports the strip chart 14 past and in contact with the heating elements; a display face plate adjustment assembly 300 for achieving the above-defined operation of display face plate 20; and storage assembly 400 for the strip chart material 14.

Print head assembly 100 includes a plurality of printing heads 102 mounted in side-by-side alignment on a pair of parallel shafts 104,106 whcih are transversely mounted at the top of chassis 30.

Figures 9, 10:
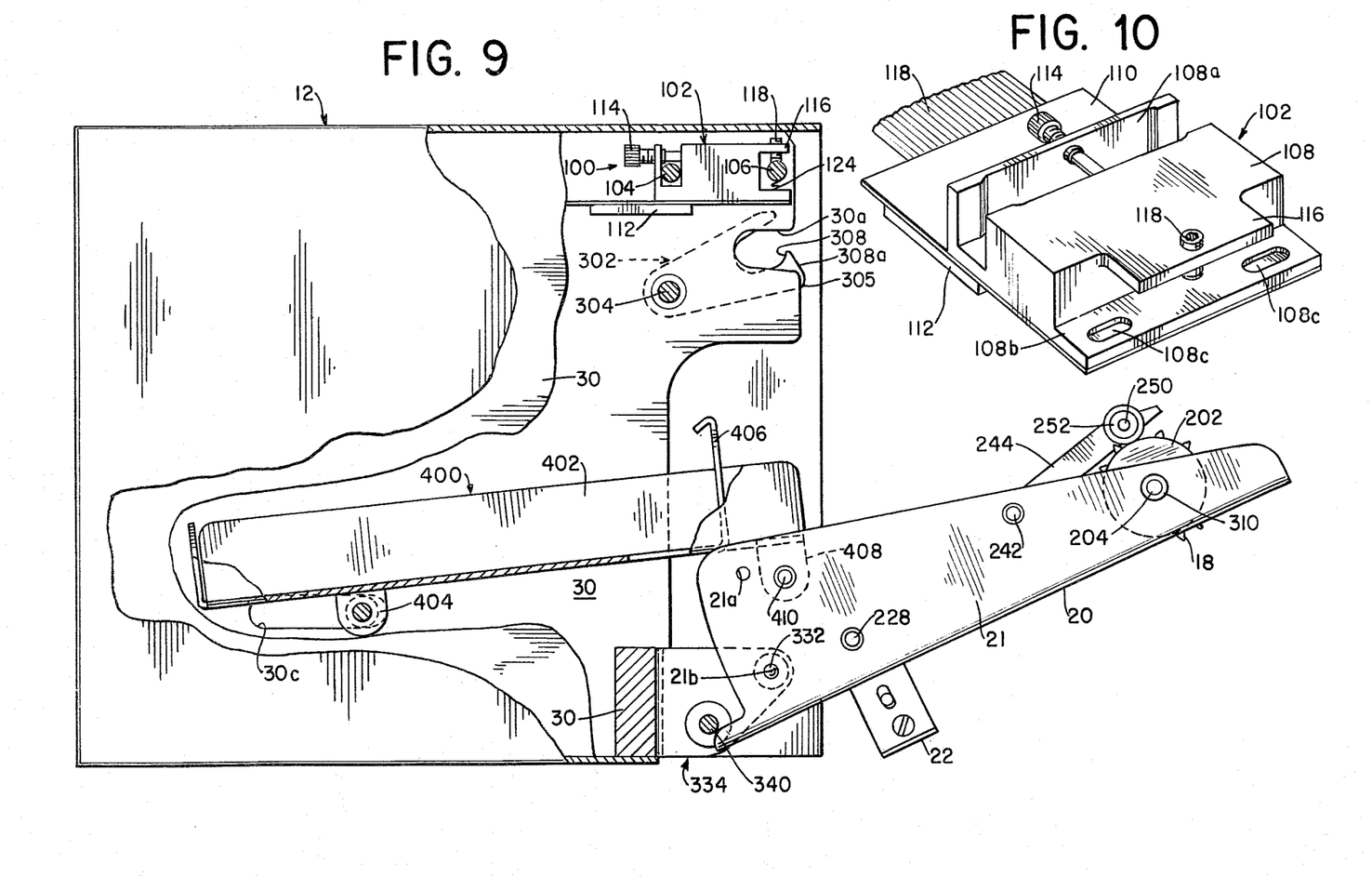
FIG. 9 is a left side elevational view with parts broken away to shown internal construction details, the display face being shown in its opened position for the replenishment of strip chart material.
FIG. 10 is a perspective view, on an enlarged scale, illustrating one embodiment of a print head in accordance with the present invention.

Referring to FIG. 10, it will be observed that each of printing heads 102 includes a mounting member 108, a printed circuit board 110 and a reinforcing strip 112. Mounting member 108 is preferably made of aluminum and includes a recessed channel 108a at the rear of its upper face and a second recessed channel 108b formed in its forward edge. Channel 108a is wider than shaft 104, but is tapered near its ends so as to receive the shaft freely but with not appreciable lateral movement. A screw 114 with a knurled head is threaded through the rear of member 108 so as to extend into channel 108a. channel 108b is substantially wider than the diameter of shaft 106 and includes a pair of elongated recesses 108c on its interior. At its upper surface, member 108b is configured to have a tab 116 which also serves as the upper bounding wall for recess 108b. A set screw 118 is threaded through tab 116 so as to extend into channel 108b.

Circuit board 110 is a conventional printed circuit on the undersurface of which heating elements are aligned so as to extend along the longitudinal dimension of channel 108a and the heating elements are controlled by electronic control circuits (not shown) which are coupled to them via the multiconductor harness 118. Mounting member 108 is bonded at the front of the upper surface of circuit board 110, and reinforcing member 112, which is preferably made of aluminum, is bonded to the undersurface of the circuit board so as to overlap mounting member 108 and to support the rear portion of circuit board 110.

Shafts 104 and 106 are preferably made of steel. Shaft 104 includes a pair of positioning sleeves 120 which can be secured in position on the shaft by means of set screws (not shown). Shaft 106 includes a plurality of axially spaced threaded bores, in each of which a set screw 122 is provided. Pairs of these bores are spaced so as to be approximately the same distance apart as recesses 108c in mounting member 108.

Each of the printing heads 102 is mounted in recorder 110 by positioning it to locate shaft 106 within channel 108b and shaft 104 within channel 108a when the screws 114 and 118 are removed from mounting member 108 and the screws 122 are removed from shaft 106. Screw 114 is then inserted into mounting member 108 and is turned in as far as it will go, thereby preventing mounting member 108 from dropping off of shaft 104. Next, a compression spring 124 is inserted into each of the bores for screws 122 in shaft 106, and the springs drop through the bore into a corresponding recess 108c in mounting member 108. Following this, the set screws 122 are inserted into shaft 106 and are turned down so as to equalize the pressure applied by each of the springs to member 108. Set screw 118 can then be inserted into member 108 and screwed down to adjust the downward tension provided to member 108 by springs 124. After all of the printing heads 102 have been so mounted in abutting relationship, the sleeves 120 are brought into contact with the two outermost printing heads and are locked into position by means of their set screws.

From the preceding description, it will be appreciated that, in their mounted positions, heads 102 are capable of limited pivotal motion about shaft 104 and/or screw 114, when the pressure of springs 124 is overcome. As a result of being capable of pivotal movement about these two orthagonal axes, heads 102 are essentially floating and it will be appreciated that they are capable of independent floating movement against the pressure of springs 124.

The drive roller assembly 16 is at the heart of transport assembly 200. It includes a pair of end caps 202 which are joined by a shaft 204 and are mounted to flange portions 21 of display face assembly 20 for rotation with respect thereto. A cylindrical platen or roller 206 with a cushioned surface is mounted between caps 202 on shaft 204 so as to be freely rotatable.

In operation, caps 202 are rotated at a precisely determined speed, as will be explained more completely hereinafter. Sprockets 18 therefor act on sprocket holes 14a of strip chart 14 to transport the strip chart at a precise linear speed. Although the springs 124 provide substantial pressure to heads 102 to force them against strip chart 14, which pressure is sufficient to compress roller 206, the linear speed of the strip chart is unaffected because roller 206 rotates freely and exerts no appreciable drag on the strip chart. In practice, end caps 202 transport strip chart 14 at a controlled speed and are disposed axially outward of heads 102 so as to receive no pressure from them. Substantially all of the pressure from heads 102 is applied to roller 206 which is rotated freely as a result of the frictional forces between it and strip chart 14, so that roller 206 exerts no appreciable drag on the strip chart. It will be appreciated that, by making roller 206 freely rotatable, it is possible to regulate accurately the linear speed of strip chart 14 and to avoid tearing the sprocket holes in the strip chart, as was common with prior art printers utilizing a unitary roller assembly.

Figure 11:
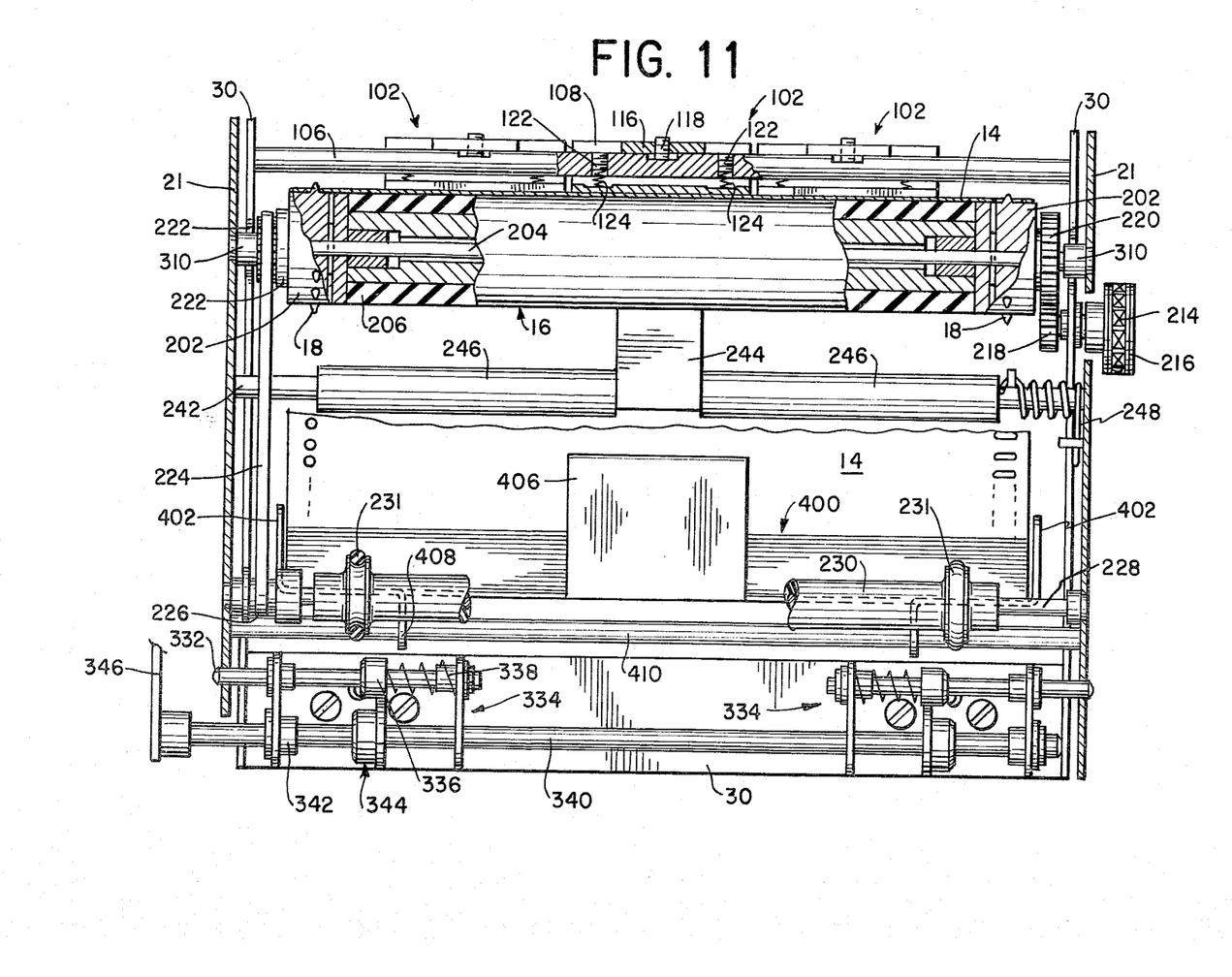
FIG. 11 is a sectional view taken along line 11—11 in FIG. 5.

Power to rotate roller assembly 16 is provided by a motor 210 which may be any conventional form of motor designed to provide a precise speed of rotation. The output shaft of motor 210 has a sprocket 212 mounted thereon which is coupled by a chain 214 to a sprocket 216 which is journaled in chassis 30. As a result of the sprocket and chain linkage, the rotational speed or sprocket 216 is accurately controlled by motor 210, so that a gear 218, which is mounted coaxially with sprocket 216 for rotation therewith, is rotated at a precise speed. A gear 220 is mounted coaxially with the righthand one of caps 202 (see FIG. 11) for rotation therewith and in a position to mesh with gear 218. As a result, end caps 202 are rotated at a precise speed, whereby a precise linear transport speed is imparted to strip chart 14, as already explained.

A sprocket 222 is mounted coaxially with the lefthand one of end caps 202 (in FIG. 11) for rotation therewith. This sprocket is coupled through a cogged belt 224 to a sprocket 226, which is mounted for rotation with a shaft 228 journaled in the flange portions 21 of display face plate 20. On shaft 228, the dual roller assembly 230 is mounted for rotation with shaft 228. Inside the bar 22, a freely rotatable roller 232 is mounted in a position to engage the periphery of one of rollers 231 and is urged into contact with same by means of a spring 234.

Transport assembly 200 also includes a guide mechanism 240 for guiding the strip chart material from its storage source 400 to the drive roller assembly 16. The entire guide assembly 240 is mounted on a shaft 242 which is journaled in flange portion 21 of display face plate 20. In the middle of shaft 242, an outwardly extending arm 244 is mounted for rotation therewith and a pair of freely rotatable rollers 246 are mounted concentrically on shaft 242 and on either side of arm 244. In addition, shaft 242 is biased by means of a spring 248 so that arm 244 is urged towards drive roller assembly 16. At the upper end of arm 244, a shaft 250 is mounted so as to be parallel to shaft 204 of drive roller assembly 16 and to extend at least from one of end caps 202 to the other. Near either end of shaft 250, there is mounted a freely rotatable roller 252 which has a circumferential, peripheral groove positioned to coincide with the sprockets 18. This permits each of rollers 252 to rotate in contact with one of end caps 202 while the sprockets 18 thereof pass through the peripheral groove of the roller.

In operation, the strip chart 14 being withdrawn from storage assembly 400 passes under and around rollers 246, upward between rollers 250 and end caps 202, over and around end caps 202 and then downward between rollers 231 and 232. On end caps 202 the sprocket holes 14a of strip chart material 14 are engaged by the sprockets 18 and the rollers 252 hold the strip chart material against end caps 202 as a result of the pressure applied by spring 248. Rollers 231 and 232 cooperate to apply a downward force to strip chart 14, thereby retaining it in contact with the front portion or end caps 202 and display face 20.

Through the described cooperation of components, transport assembly 200 achieves smooth transportation of strip chart 14 at a precise and uniform linear speed.

Figure 3:
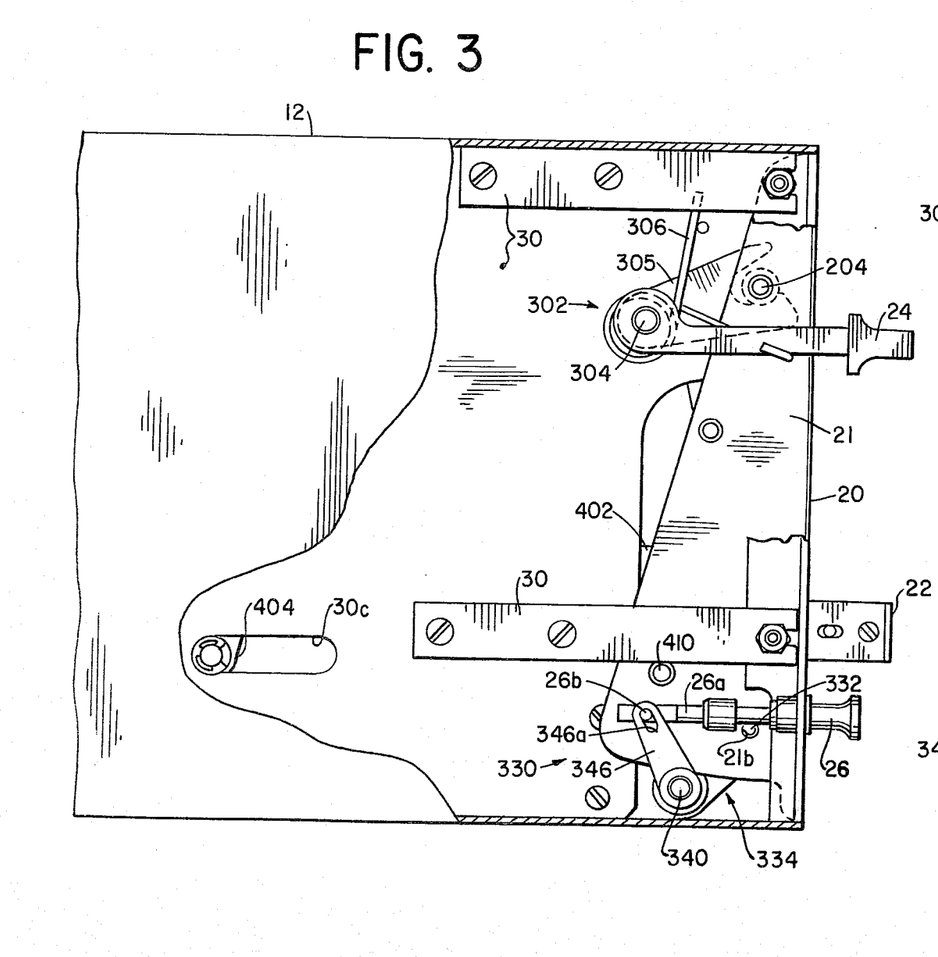
FIG. 3 is a sectional view taken along line 3—3 in FIG. 2, the display face of the recorder being shown in its vertical position.
Figure 4:
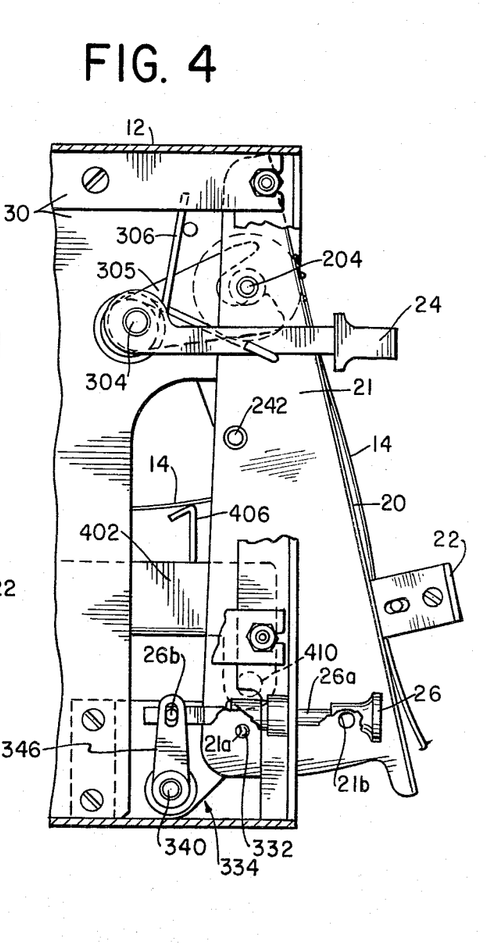
FIG. 4 is a fragmentary sectional view similar to FIG. 3 with the display face being shown in its tilted viewing position.

The face plate control mechanism 300 includes an upper control mechanism 302 which releasably retains the upper end of display face plate assembly 20 so that it may be pivoted downward to gain access to the interior of recorder 10; and a lower control mechanism 330 which releasably retains the lower end of display face assembly 20 so that it may be positioned to two different viewing positions (illustrated in FIGS. 3 and 4, respectively).

All of the components of upper control mechanism 302 are mounted on a shaft 304 which is journaled in chassis 30 and extends across the entire recorder 10. At one end of shaft 304, lever 24 is secured and is biased by means of a spring 306 so as to be urged upwardly. In the vicinity of shaft 304 and near either end thereof, chassis 30 has a cut out opening 30a. Near either end of shaft 304, a latch member 305, having a hooked arm 308 with a cam surface 308a, is secured to shaft 304 so that arm 308 at least partially covers cut-out 30a when lever 24 is in its normal position (see FIGS. 3 and 4).

Between each flange portion 21 of display face assembly 20 and a respective end cap 202, there is provided an axially extending lug 310 which is positioned and dimensioned to be received in one of cut-outs 30a of chassis 30. When the lugs 310 are so received, the hooked arms 308 block the cut outs 30a and prevent withdrawal of the lugs 310 (see FIGS. 3 and 4). When lever 24 is depressed, shaft 304 is rotated clockwise and latches 305 rotate therewith so as to withdraw hooked arms 308 from their positions in which they partially block slots 30a. As a result, lugs 310 are released and display face assembly 20 drops forward, of its own weight, to the position shown in FIG. 9. Display face assembly 20 may be restored to its locked position by pressing lugs 310 into slots 30a so as to force hooked arms 308 downward (owing to the action of cam surfaces 308a) against the pressure of spring 306. After lugs 310 pass hooked arms 308, the arms snap back up and lock display face assembly 20 in position, as already explained.

The key element in the lower control mechanism 330 is an axle for rotation defined by the axially aligned, spaced shafts 332. Each of the shafts 332 can be selectively inserted into one of a pair of spaced apertures 21a,21b near the bottom end of each flange portion 21 of display face assembly 20. When shafts 332 are within apertures 21b, display face assembly 20 is in its vertical position (FIG. 3) and when shafts 332 are within apertures 21a, display face assembly 20 is in its tilted position (FIG. 4). The apertures 21a,21b are dimensioned to receive shafts 332 with a slight loose fit, so that, in either position, the display face assembly rotates freely about the axle defined by shafts 332.

As will be explained in detail below, shafts 332, owing to spring loading, are normally extended and protrude into apertures 21a or 21b. When plunger 26 is pulled outward, a mechanical linkage causes the shafts 332 to be drawn together along their axes, thereby withdrawing the shafts from the apertures into which they extend. This frees the lower end of display face assembly 20 so that it may be adjusted to either position. Upon adjustment of the display face and release of plunger 26, the spring loading of shafts 332 causes them to be urged back into one pair of the apertures 21a or 21b.

Each of shafts 332 is mounted for axial sliding movement in a bracket assembly 334 which is secured at the lower front portion of chassis 30 by conventional means. An actuating sleeve 336 is coaxially affixed along the body of shaft 332 and a compression spring 338 is coaxially mounted on shaft 332 between the actuating sleeve 336 and bracket 334 so as to urge the acuating sleeves 336, and therefore the shafts 332, axially outward or apart. Each of actuating sleeves 336 has a chamfered surface 336a for a purpose to be described in detail below.

Lower control mechanism 330 also includes a control shaft 340, which is substantially parallel to shafts 332 and is journaled in bearings 342 each mounted on one of brackets 334. Opposite the sleeves 336, a cam member 344 is secured to shaft 340 for rotation therewith. Each cam member 344 includes a camming surface 346 which is inclined with respect to shaft 340 so that the portion thereof closest to sleeve 336 is also closest to the corresponding flange portion 21 of display face assembly 20. Preferably, a portion of camming surface 336 engages chamfer 336a of sleeve 336. At the end of shaft 340 closest to plunger 26, an arm 346 is affixed to extend radially outwardly of shaft 340. Arm 346 has an elongated aperture 346a near the radially outermost end thereof. Plunger 26 has a shank portion 26a which is mounted in chassis 30 for axial sliding movement and a pin 26b which extends radially outwardly of shank 26a is received in aperture 346a for sliding movement.

Figure 6:
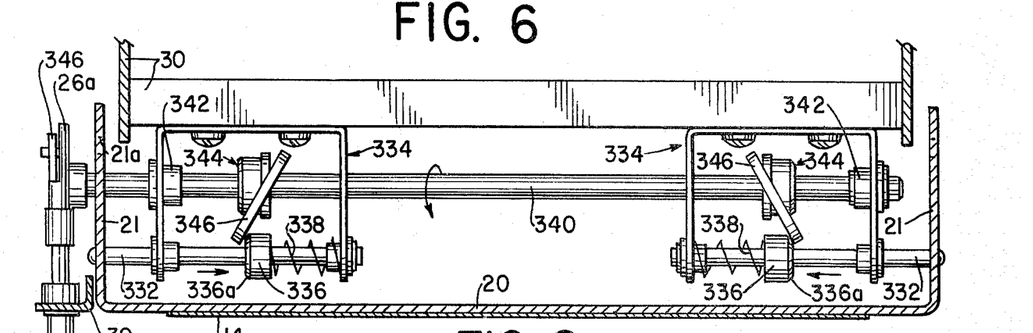
FIG. 6 is a fragmentary sectional view taken along line 6—6 in FIG. 5.
Figures 7, 8:
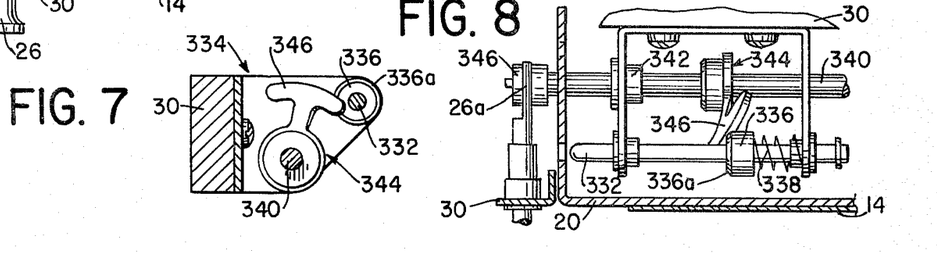
FIG. 7 is a fragmentary sectional view taken along line 7—7 in FIG. 6.
FIG. 8 is a fragmentary sectional view corresponding to the lefthand portion of FIG. 6, the mechanism being shown in an activated position to permit release of the display face for repositioning thereof.

In operation plunger 26 is normally in the position shown in FIG. 3, at which time the shafts 332 extend either into the corresponding apertures 21a or 21b. When plunger 26 is pulled outward (see FIG. 4), pin 26b draws the outermost end of arm 346 with it, thereby rotating shaft 340 clockwise. This causes cams 344 to be rotated from the position shown in FIG. 6 to the position shown in FIG. 8, so that cam surfaces 336 act upon camfers 336a to bring sleeves 336 together against the pressure of springs 338. As a result, the outermost ends of shafts 332 are withdrawn from the apertures into which they initially extended (see FIG. 8), and the lower end of display face assembly 20 is freed to be moved inward or outward. When plunger 26 is released, the pressure of springs 338 acting through camming surfaces 336 returns the plunger to its normal position and shafts 332 are, likewise, urged against the inner surfaces of flange portions 21. As soon as shafts 332 are aligned with corresponding apertures, they are forced into the apertures and the lower end of display face assembly 20 is once again locked into one of its two positions.

Strip chart storage assembly 400 includes a tray 402, which is movable in a generally horizontal direction between the front and rear of recorder 10. This movement is achieved by providing the tray with a pair of laterally outwardly projecting, freely rotatable rollers 404 between its front and rear ends. These rollers protrude through elongated slots 30c in chassis 30 to provide support for tray 402 and to permit its front to rear movement by rotating freely as tray 402 moves. Near the front of the tray, an upwardly projecting support member 406 is provided to guide the strip chart material from storage assembly 400 to transport assembly 200. At the front of tray 402, there are provided a pair of projections 408 which are mounted for rotation about a shaft 410, which is secured between flange portions 21 of display face assembly 20.

Figure 5:
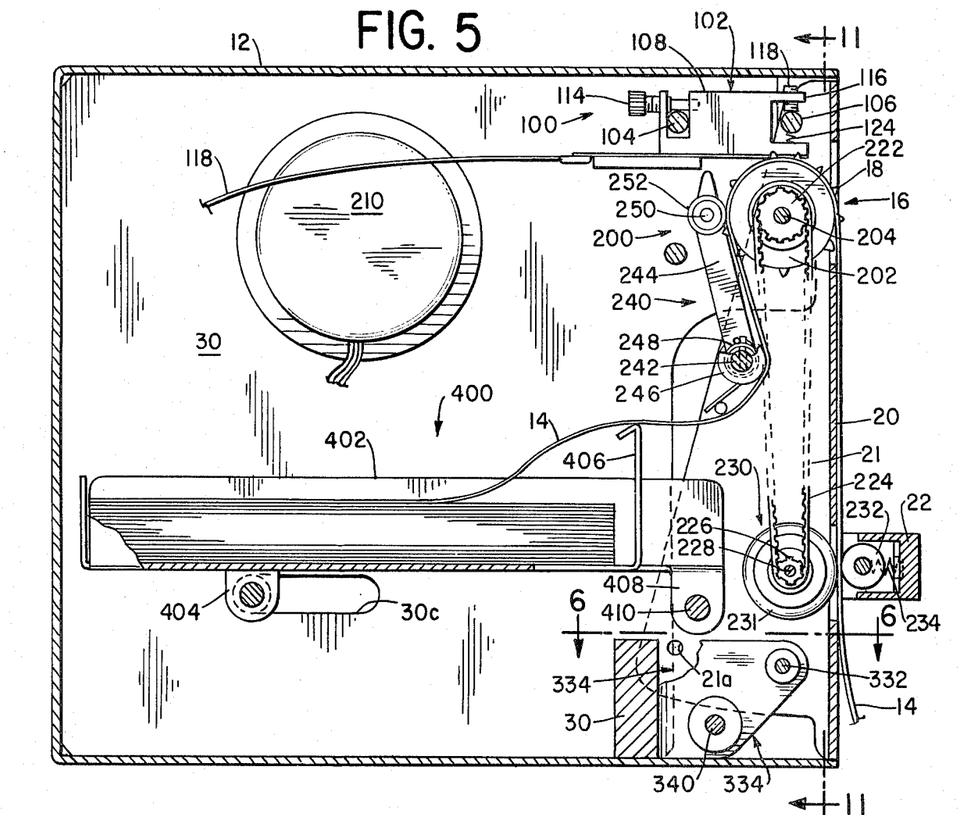
FIG. 5 is a sectional view taken along contour 5—5 in FIG. 2.

From the foregoing description, it will be appreciated that, when display face assembly 20 is brought to its open position (see FIG. 9) tray 402 is drawn forward (compare FIGS. 5 and 9) owing to its connection to display face assembly via shaft 410. This permits ready and convenient access to tray 402 for changing or replenishing the strip chart material. This is also a convenient position for inserting the strip chart material under roller 246 and between rollers 252 and end caps 202 while permitting a long end thereof to extend over the end caps and out onto face plate assembly 20. When face plate assembly 20 is restored to its upright position, tray 402 returns to its rearward position. The end portion of the strip chart material may then be inserted between rollers 231 and 232 and pulled downward therebetween, thereby holding the strip chart 14 flat against the front of face plate assembly 20. This prepares the strip chart recorder 10 for normal operation.

Figure 12:
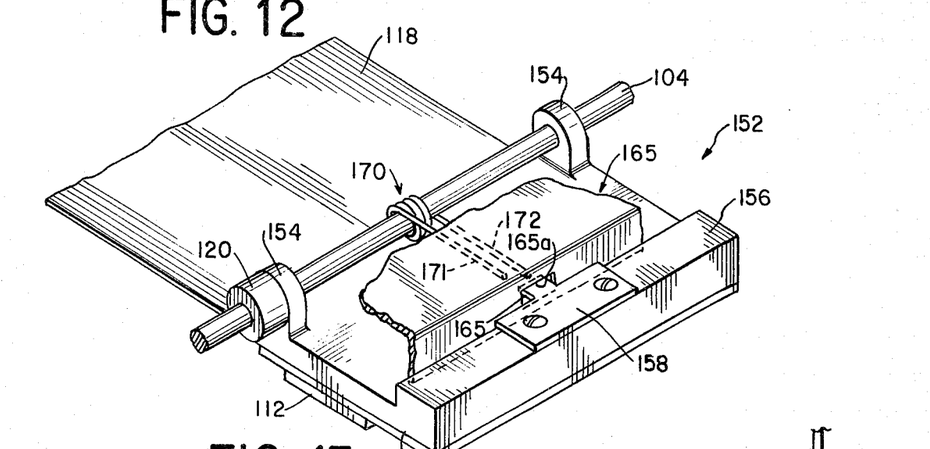
FIG. 12 is a fragmentary perspective view illustrating an alternate form of a print head in accordance with the present invention, the head being shown in its mounted position in the strip chart recorder.
Figure 13:
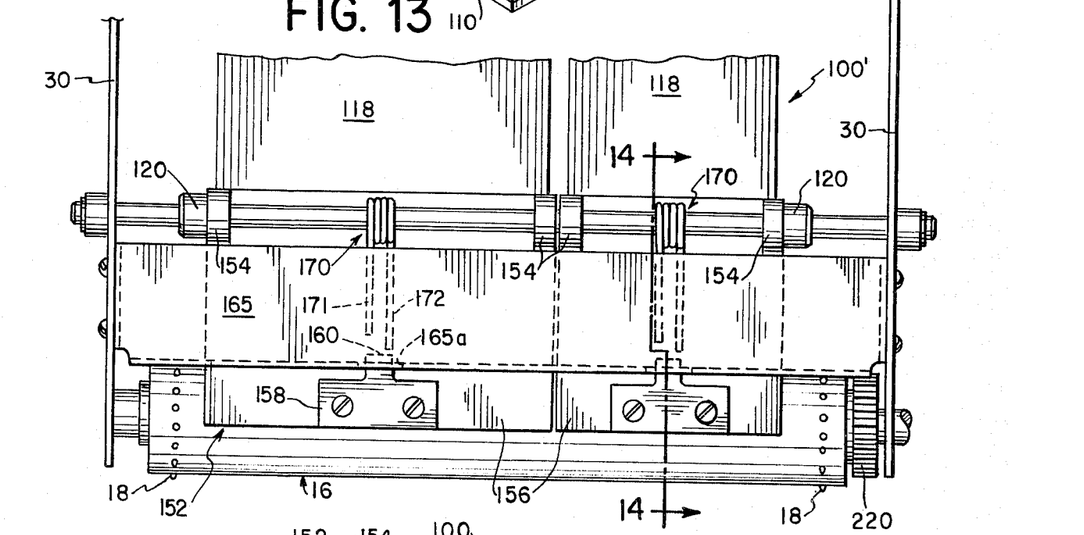
FIG. 13 is a fragmentary top plan view, similar to FIG. 2, illustrating the alternate form of the print head of FIG. 12 in position in the strip chart recorder.
Figure 14:
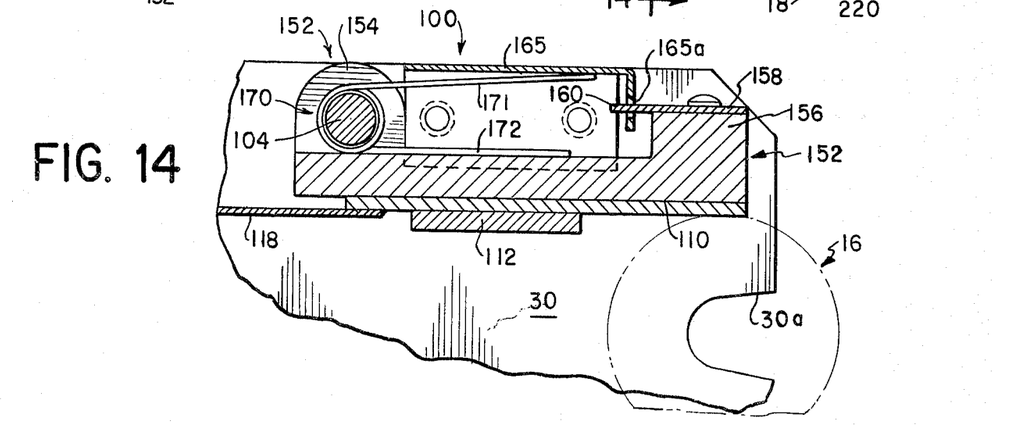
FIG. 14 is a fragmentary sectional view taken along line 14—14 in FIG. 13.

FIGS. 12-14 disclose an alternate embodiment 100' of print head assembly 100. In this alternate embodiment, elements which are similar to elements in print head assembly 100 are indicated by the same reference characters. The primary distinction of print head assembly 100' is that it utilizes only two print head mounting members 152 instead of the three members 108 in print head assembly 100, that the mounts are of unequal width, and that they are of substantially different construction than mounts 108.

Near the rear of each mounting member 152 at each lateral edge thereof, there is provided an upwardly extending bearing member 154 which is adapted to fit on shaft 104 so as to permit the mounting member to rotate with respect to the shaft. Near the front edge of mounting member 152, there is provided a raised ledge 156 on which a guide member 158 having a rearwardly extending tab 160 is mounted by conventional means.

A retaining bridge 165 is mounted to chassis 30 by conventional means so as to extend across the chassis between shaft 104 and ledge 156 of mounting member 152. The bridge includes a plurality of openings 165a, each of which is positioned to receive the tab 160 of one of mounting members 152. Intermediate the two bearing members 154 corresponding to each of mounting members 152, a spring 170, having arms 171,172, is coaxially mounted on shaft 104 so that its arms extend between ledge 165 and mounting member 152 to exert a separating force therebetween.

In practice, mounting heads 152 and springs 170 are mounted on shaft 104 when the shaft is assembled to chassis 30. Bridge 165 is then positioned over the mounting members 152 so as to receive the tabs 160 and is secured to chassis 30. As a final assembly step, mounting members 152 are positioned so that tabs 160 are substantially centered within openings 165a and bridge 165 and sleeves 120 are secured in position on shaft 104 so as to prevent movement of mounting members 152 therealong.

In operation, mounting heads 152 conform to drive roller assembly 16 by pivoting about shaft 104 and springs 170 provide the necessary pressure to keep the printing elements on circuit board 110 in intimate contact with strip chart 14. Tabs 160 cooperate with openings 165a to limit the extent of pivotal movement of mounting heads 152 by stopping the rotation thereof when tab 160 engages either the upper or lower extreme of opening 165a.

Although printing head assembly 100' does not support the mounting members for independent floating movement, as was the case in printing head assembly 100, it does provide substantially uniform darkness of printing when shaft 104 is maintained parallel to drive roller assembly 16 and the drive roller assembly has a cushioned surface.

Although preferred embodiments of the invention have been disclosed for illustrative purposes, it will be appreciated by those skilled in the art that many additions, modifications, and substitutions are possible, without departing from the scope and spirit of the invention as defined in the accompanying claims.

What is claimed is:

1. A device for recording graphical information on a strip chart which is movable with respect to the device, said recording device comprising:
    a plurality of printing means arranged in side-by-side alignment transversely with respect to the direction of movement of the strip chart, each printing means including a plurality of independently actuable elements for marking the strip chart;
    means for retaining said strip chart in contact with said printing means;
    means for supporting each of said printing means for independent floating movement with respect to said retaining means; and
    means for transporting said strip chart past said printing means.

2. A device according to claim 1 wherein said strip chart is composed of thermo-sensitive material and each printing means includes a plurality of separately controllable heating elements.

3. The device according to claim 1 wherein each of said printing means had orthogonally disposed first and second axes, said supporting means comprising:
    means mounting each of said printing means for pivotal movement about said first axis;
    means mounting each of said printing means for pivotal movement about said second axis; and
    resilient means urging said printing means against said retaining means.

4. The device of claim 1 wherein said transporting means comprises at least one driven roller mounted for rotation about an axis which is transverse to the direction of movement of said strip chart, said roller being adapted to impart said movement to said strip chart, and said retaining means comprises a cylindrical platen mounted coaxially on said driven roller for independent axial rotation.

5. The device of claim 4 wherein said cylindrical platen is compressible.

6. The device of claim 4 adapted for use with a strip chart having sprocket holes extending therealong, said transporting means further comprising:
    a plurality of sprockets arranged on said driven roller for engagement with said sprocket holes;
    means for passing said strip chart against said driven roller so that said sprockets engage said sprocket hole.

7. The device of claim 6 wherein said pressing means includes at least one roller cooperating with each of said at least one driven rollers to maintain said sprockets in said sprocket holes.

8. The device of claim 4 wherein said transporting means includes motive means for moving said strip chart at a selected speed.

9. The device of claim 8 wherein said motive means comprises a d.c. stepping motor.

10. A recording device having orthogonally related longitudinal and transverse axes and utilizing a strip chart movable longitudinally with respect to said device, said recording device comprising:
    a chassis,
    at least one printing means arranged transversely in side by side relationship;
    means for retaining said strip chart in contact with said printing means;
    a display face positioned to have printed strip chart pass thereover and having first and second spaced transverse axes;
    first mounting means for mounting said display face to said chassis for pivotal movement about said first transverse axis;
    second mounting means for mounting said display face to said chassis for pivotal movement about said second transverse axis; and
    releasable means normally preventing pivotal movement of said display face about said transverse axes for selectively enabling said pivotal movement.

11. The device of claim 10 wherein at least one of said first and second mounting means include complementary means on said chassis and said display face cooperatively engaged to mount said display face and actuable into disengagement.

12. A device in accordance with claim 11 wherein said complementary means include means permitting engagement in two longitudinally separated positions.

13. A device in accordance with claim 12 wherein said complementary means comprises a pair of axially aligned shafts protruding transversely from said display face and means for rotatably capturing each of said shafts in selectable, longitudinally separated positions.

14. A device in accordance with claim 13 wherein said shafts are biased in their protruding positions, said complementary means including retracting means actuable to retract said shafts by drawing them together, said capturing means being a pair of longitudinally spaced apertures in said chassis for each shaft, said apertures being dimensioned to receive the respective shaft when it is in its protruding position.

15. A device according to claim 14 wherein said retracting means comprises a cam means rotatable about a transverse axis and inclined with respect to a plane normal to said axis, and follower means affixed to each of said shafts in a position to be engaged by said cam means when the same is rotated, so that said follower means are drawn together.

16. A device according to claim 10 further comprising:
 means for supporting each of said printing means for independent floating movement with respect to said retaining means; and
 means for transporting said strip chart past said printing means.

17. A device according to claim 16 wherein said strip chart is composed of thermo-sensitive material and each printing means includes a plurality of independently actuable heating elements for making said strip chart.

18. The device according to claim 16 wherein each of said printing means has orthogonally disposed first and second supporting axes, said supporting means comprising:
 mens mounting each of said printing means for pivotal movement about said first supporting axis;
 means mounting each of said printing means for pivotal movement about said second supporting axis; and
 resilient means urging said printing means against said retaining means.

19. The device of claim 16 wherein said transporting means comprises at least one driven roller mounted for rotation about an axis which is transverse to the direction of movement of said strip chart, said roller being adapted to impart said movement to said strip chart, and said retaining means comprises a cylindrical platen mounted coaxially on said driven roller for independent axial rotation.

20. The device of claim 19 wherein said cylindrical platen is compressible.

21. The device of claim 19 adapted for use with a strip chart having sprocket holes extending therealong, said transporting means further comprising:
 a plurality of sprockets arranged on said driven roller for engagement with said sprocket holes;
 means for pressing said strip chart against said driven roller so that said sprockets engage said sprocket holes.

22. The device of claim 21 wherein said pressing means includes at least one roller cooperating with each of said at least one driven rollers to maintain said sprockets in said sprocket holes.

23. The device of claim 19 wherein said transporting means includes motive means for moving said strip chart at a selected speed.

24. The device of claim 23 wherein said motive means comprises a d.c. stepping motor.

25. A device according to claim 10 further comprising:
 means for supporting each of said printing means for independent pivotal movement about a transverse axis remote from said retaining means;
 means for transporting said strip chart past said printing means; and
 resilient means constructed and arranged to urge said printing means towards said retaining means.

26. A device according to claim 25 wherein said strip chart is composed of thermo-sensitive material and each printing means includes a plurality of independently actuable heating elements for marking said strip chart.

27. The device of claim 25 wherein said transporting means comprises at least one driven roller mounted for rotation about an axis which is transverse to the direction of movement of said strip chart, said roller being adapted to impart said movement to said strip chart, and said retaining means comprises a cylindrical platen mounted coaxially on said driven roller for independent axial rotation.

28. The device of claim 25 wherein said cylindrical platen is compressible.

29. The device of claim 25 adapted for use with a strip chart having sprocket holes extending therealong, said transporting means further comprising:
 a plurality of sprockets arranged on said driven roller for engagement with said sprocket holes;
 means for pressing said strip chart against said driven roller so that said sprockets engage said sprocket hole.

30. The device of claim 29 wherein said pressing means includes at least one roller cooperating with each of said at least one driven rollers to maintain said sprockets in said sprocket holes.

31. The device of claim 25 wherein said transporting means includes motive means for moving said strip chart at a selected speed.

32. The device of claim 31 wherein said motive means comprises a d.c. stepping motor.

33. In a device for recording graphical information on a strip chart which is movable with respect to said device, said device including means for printing on said strip chart and means for urging the printing means against the strip chart, the improvement comprising:
 at least one driven roller mounted for rotation about an axis which is transverse to the direction of movement of said strip chart,
 means on said roller engaging said strip chart for imparting said movement to said strip chart when said roller is rotated; and
 a cylindrical platen mounted coaxially on said driven roller for independent axial rotation, said platen being positioned so that said strip chart is urged thereagainst by said printing means.

34. The device of claim 33 wherein said cylindrical platen is compressible.

35. The device of claim 33 adapted for use with a strip chart having sprocket holes extending therealong, said device further comprising:
 a plurality of sprockets arranged on said driven roller for engagement with said sprocket holes; and
 means for pressing said strip chart against said driven roller so that said sprockets engage said sprocket hole.

36. The device of claim 35 wherein said pressing means includes at least one roller cooperating with each of said at least one driven rollers to maintain said sprockets in said sprocket holes.

37. The device of claim 33 further including motive means for moving said strip chart at a selected speed.

38. The device of claim 37 wherein said motive means comprises a d.c. stepping motor.

* * * * *